(No Model.)
W. MAIN.
SECONDARY BATTERY.
No. 485,013. Patented Oct. 25, 1892.
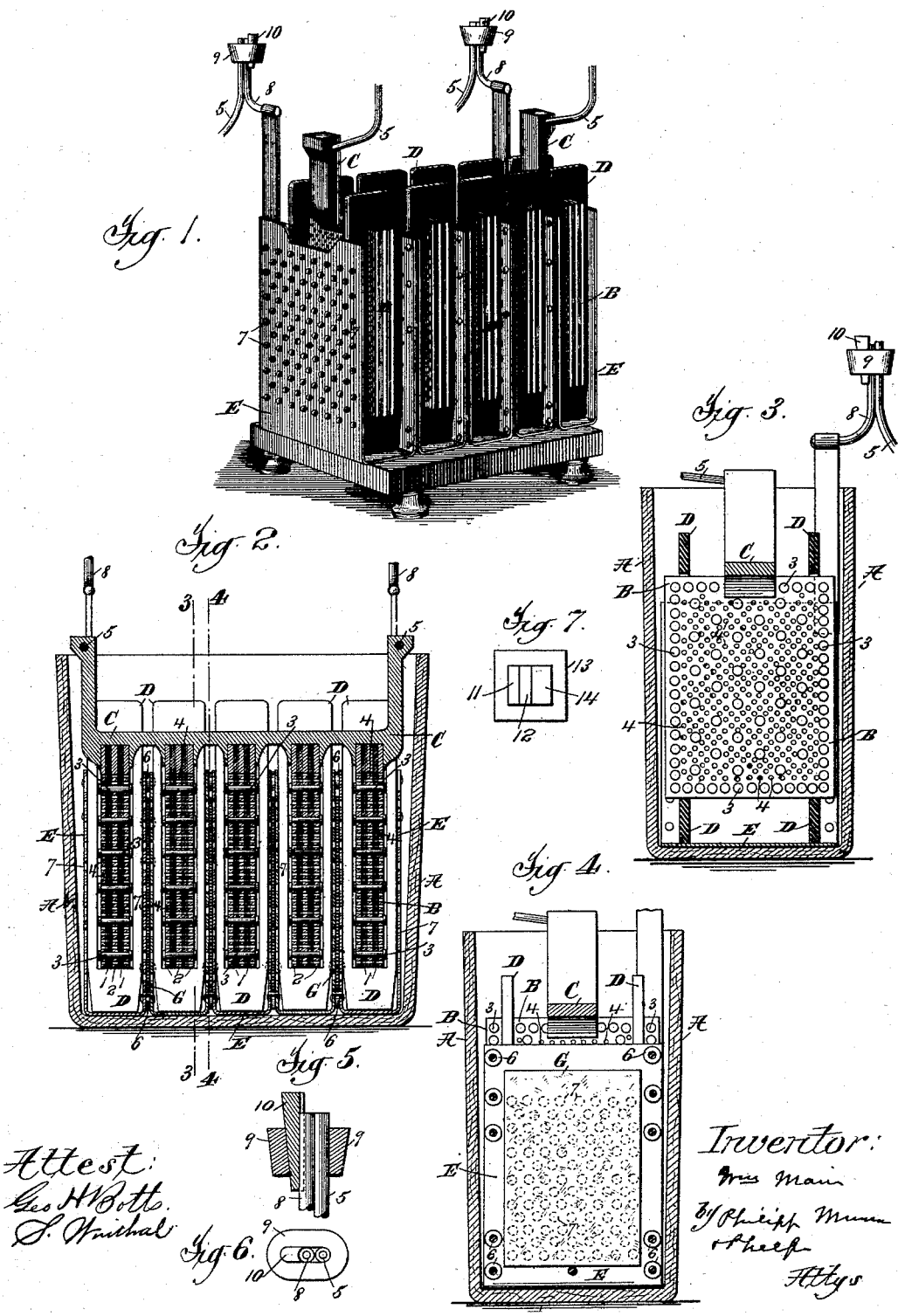
Attest:
Geo. H. Bott.
S. Michal
Inventor:
Wm. Main
By Philipp Munn
& Sheep
Attys

UNITED STATES PATENT OFFICE.

WILLIAM MAIN, OF BROOKLYN, NEW YORK.

SECONDARY BATTERY.

SPECIFICATION forming part of Letters Patent No. 485,013, dated October 25, 1892.

Application filed February 15, 1892. Serial No. 421,515. (No model.)

*To all whom it may concern:*

Be it known that I, WILLIAM MAIN, a citizen of the United States, residing at Brooklyn, county of Kings, and State of New York, have invented certain new and useful Improvements in Secondary Batteries, fully described and represented in the following specification and the accompanying drawings, forming a part of the same.

This invention relates to secondary batteries and the construction of cells and plates designed therefor.

The invention has been made in connection with secondary batteries of that class covered by my prior Letters Patent, Nos. 359,934, 401,289, 401,290, and 401,291; and the invention consists in part of improvements thereon. Reference is made, therefore, to these patents for a full statement of the battery action and the special construction and function of certain parts; but it will be understood that the improvements forming the broad invention in the present case are applicable, also, in many other batteries.

In the patents above referred to there have been described oxygen-electrodes, consisting of compound laminated plates of lead or other suitable material and plates of conducting material, the compound plate being provided with numerous transverse perforations, and preferably with graphite or other conducting material between the laminæ, and hydrogen-electrodes, consisting of plates of copper or other electrically-conductive material, forming supports for the active material, consisting of zinc and mercury, the copper supports being arranged horizontally with the zinc and mercury contained in pockets thereon.

I have discovered that the horizontal position of the supports is not necessary, but that mercury may be drawn to the top edge of a vertical plate of copper or other material having an affinity for mercury in quantities sufficient to form an amalgam with the zinc deposited thereon by electrolytic action during the charge of the cell, and by a construction employing a vertical support I am able to attain certain important advantages over constructions employing a horizontal support, especially the following: With the supports and plates forming the oxygen-electrode arranged in a horizontal position and alternated the mercury is liable to drop from the copper to the lead, amalgamating the latter. It is found, also, that deposits of zinc sometimes form about the edges of the support and depend therefrom, so as to reach the lead plates and short-circuit the cell, and when a series of supports are used the removal of these projections involves considerable labor. It is found that the mercury is uniformly distributed over the entire surface of the vertical support and that the danger of the mercury reaching the lead plates is avoided, any mercury passing from the copper support falling directly to the bottom of the cell. Moreover, there is little tendency to form zinc projections extending toward the plates from the supports, as such projections must form horizontally, and, moreover, such projections may readily be removed from the top of the cell by passing a rod down between the plates and moving it to and fro, so as to break them off. If a glass cell be used, as is preferable, such projections can readily be seen, and thus removed. Moreover, by the use of a vertical support the amount of zinc and mercury required is reduced, as with the horizontal arrangement an independent source of mercury and zinc is required for each support, while with the vertical arrangement a common source of zinc and mercury for all the supports may be used, and a very small supply of these materials thus answers for the entire battery. The vertical support may be of any suitable material conductive of electricity which is inactive in the battery and has an affinity for mercury, but is not penetrated thereby. I prefer, however, to use thin copper plates, as copper has high electrical conductivity and is not acted on chemically in the presence of zinc. By "inactive material" I mean one which acts as a mere surface vehicle for the active material without taking part in the reactions of the battery. By a "material having an affinity for mercury" I mean one which is wet by mercury, so that the mercury spreads upward and over the surface from one part of the support to another. By "material which is not penetrated by mercury" I mean one upon the surface of which mercury or an amalgam is supported without the mercury passing into or combining with the body of the material, so as to cause disintegration of the same.

The supports may be smooth or provided with roughened surfaces or small perforations and fairly-good results be obtained; but the deposit tends to scale off and the support is preferably perforated with quite large holes, which I have found much preferable to small holes or to roughening the sides of the support as the amalgam is deposited through the holes so as to grip upon the rear sides of the support, the scaling of the deposited zinc amalgam thus being prevented. These large holes also have a special function in connection with my preferred form of zinc-supply, by which I am enabled to avoid a difficulty previously found in the commercial use of secondary batteries and obtain an important advantage, as follows: In the commercial handling of cells they must be shipped without acid in them, and it is undesirable to ship the copper support with any considerable deposit of amalgam thereon, as it is liable to crumble off from the jarring and rough handling received, especially during a railroad transportation. It has heretofore been necessary, therefore, when cells were unpacked and set up to put sulphate of zinc into the fluid and give the cells a prolonged charging for the purpose of providing them with a good supply of metallic zinc. I avoid this necessity by the use of sheets of amalgamated zinc as a zinc-supply for starting the battery. Any suitable construction and arrangement of the zinc plates and supporting parts may be used; but I prefer to make the copper supports double by arranging them in pairs, the two supports of each pair being placed close together, and to place a zinc plate between each pair of such supports. The electrolytically-deposited amalgam is preferred; but the ordinary sheet-zinc amalgamated answers very well, and used as described enables the cell to be put into use at once. The copper supports are usually amalgamated at the start as a result of this construction, and the cell can be shipped without liquid, but with a supply of amalgam to commence operations with. If the oxygen pole-piece is charged and zinc present in sufficient quantity on the hydrogen-electrode, a good discharge can be obtained from the cell when first set up. Upon recharge the zinc which has passed into solution will be redeposited over the copper surface. The large holes in the supports allow action to take place freely between the zinc on one side and the lead peroxide on the other, as the zinc would otherwise be entirely partitioned off. The holes also render the reverse sides of the supports available for the retention of amalgam and active during discharge, the active surface thus being increased.

While the construction just described, employing doubled perforated supports and sheets of amalgamated zinc supported loosely between them, is preferred, other constructions may be used. Thus I may rivet the sheets onto the supports, so as to form a single construction therewith, or it may be found that a paste of zinc amalgam pressed onto the surface and into the interstices of a support provided with small perforations or having a roughened surface will answer the purpose.

The oxygen-electrode consists, preferably, of vertical compound plates formed, as described in the patents referred to, of a series of thin sheets of lead or other suitable material and thicker sheets of conductive material, all provided with numerous perforations and secured together by rivets of suitable material. It will be understood, however, that this electrode may be of any other suitable construction and either of laminated or grid form.

In the use of laminated plates it is found that the laminæ are increased in thickness by oxidation during the battery action, the sides of the plates being forced out, thus weakening and injuring the electrode. I avoid this difficulty by providing space between the laminæ for this increase of thickness, and I attain this result by my improved process of making the plate in which I coat the laminæ with soluble material and dissolve out this material. The soluble material may be dissolved out after the plate is completed and before placing it in the battery acid; but I preferably use a soluble material which is not injurious to the battery, so that the material may be dissolved out in the battery acid, and by the use of material containing zinc or other soluble material, which is needed in the battery, I am able to make the soluble material perform two functions.

Any suitable material may be used either alone or mixed with other materials; but I prefer to use a mixture of oxide of zinc and graphite, the oxide of zinc dissolving out in the battery fluid and passing to the hydrogen-electrode, where it is required, while the graphite adheres to the surfaces of the laminæ, so as to increase their conductivity. The oxide of zinc thus performs the double function above described—that is, of providing space between the laminæ for their increase in thickness, and at the same time being of use in the battery. If, however, the character of the battery and laminated electrode is such that a deposit of zinc is not required, other suitable soluble materials not injurious in the battery may be used, such as salts of alumina or sulphate of magnesia. Sugar or salt, also, may be used; but these should be dissolved out before placing the electrode in the battery, as they interfere with the battery action. In place of graphite, also, it is evident that other electrically-conductive material may be used; but graphite is preferred.

The mercury-supply may be placed in any part of the cell with surface contact between the mercury and some part of the copper supports, the mercury spreading rapidly over the surface of the supports, this action being aided, probably, by the formation of the zinc deposit. I prefer, however, to place the deposit in the bottom of the cell with the lower end of the supports in contact therewith, any mercury from the plates thus passing directly to the supply. An efficient supply may readily be formed by pouring a little mercury into the cell. The support may be made of material of such porosity as to retain the mercury, thus forming the mercury-supply, or a plate perforated with small holes or having roughened surfaces may be found to answer the purpose. A supply of metallic mercury may be provided, also, by the use of a soluble salt of mercury in beginning the operation of the battery, this yielding metallic mercury on charge.

Any suitable electrolyte may be used in the cell, such as ordinary dilute sulphuric acid or dilute sulphuric acid containing a solution of zinc or a solution, of mercury or both. I do not confine myself to any particular electrolyte.

In connection with my improved cell I have devised, also, an improved connector or clamp for electric conductors, which forms in itself a part of my invention. It is important that the conductivity between electric conductors clamped together should be as high as possible and that this conductivity should be maintained unimpaired by corrosion due to the battery acids. The screw-clamps heretofore made of hard rubber are not affected by corrosion, but are expensive, brittle, and, moreover, are not conductive, so that the conduction of terminals forced together thereby depends upon the single faces of the terminals in direct contact. Brass has been used; but while this is conductive it is corroded by the battery acids.

I provide an improved connector which is conductive throughout and non-corrodible, so that the entire surfaces of the terminals form contact-surfaces, and, moreover, the contact is not affected substantially by corrosion due to the battery action. In my improved clamp I use lead, preferably alloyed with antimony or some similar non-corrodible metal to harden it, and the key is of the same material. The connector consists of a collar, the opening in which is of suitable form to receive the parts which are to be clamped together and provide large surfaces of contact, and the key is wedge-shaped and corresponds in form to the parts which are to be engaged thereby, so as to clamp them securely together. This conductor may be used for clamping together two round or flat conductors or clamping a conductor to the connector or to any other part, the form of the collar and wedge being varied, as required.

By my invention I provide a very simple, cheap, and convenient connector which provides for high conductivity between the parts connected thereby and by which the conductivity is maintained substantially unimpaired by the action of the battery acids. The wedge, moreover, may be put in and taken out more readily than a screw, which is liable to stick, and a screw of sufficient strength cannot be made out of lead alloy and the contact-surface of a screw-point is small.

The terminals used with my cell may be of any construction and may consist simply of a conductor of lead or other non-corrodible material. If lead be used, however, it will be necessary to use a quite large terminal for securing the conductivity required. I prefer, therefore, to use terminals consisting of a core of copper and a lead covering, the copper core securing the conductivity required, while the lead covering prevents corrosion, a small efficient terminal being thus formed.

Referring now to the accompanying drawings, in which I have illustrated my invention as embodied in a cell of the preferred form, Figure 1 is a perspective view of the cell with the casing removed. Fig. 2 is a vertical section transverse to the electrodes. Figs. 3 and 4 are sections, respectively, on lines 3 and 4 of Fig. 2. Fig. 5 is a detail section of my improved connector. Fig. 6 is a plan of the same. Fig. 7 is a plan view showing the connector applied in connection with two flat terminals.

A is the cell-casing, which may be of any suitable material, but is preferably of glass, so as to allow free inspection of the parts contained therein.

B is the oxygen-electrode, which in the form shown consists of a series of compound laminated plates arranged vertically. The structure of these compound laminated plates is preferably substantially the same as that of the patents above referred to, consisting of a series of thin laminæ 1, of suitable material, preferably lead, separated by thicker sheets or plates 2, of suitable conducting material, all being secured together by rivets 3, of the same material as the laminæ, and provided with a large number of perforations, as shown at 4. In constructing these compound plates, however, I prefer to provide space for the expansion of the laminæ, due to oxidation in the battery, by coating them with soluble material, as above described, which is removed in solution either in the battery fluid or before putting the plates in the battery, graphite or other suitable conducting material being preferably mixed therewith or otherwise applied to the laminæ. The compound plates B are connected together to form the oxygen-electrode by a yoke C, to which the terminals 5 are connected in the usual manner, and are supported within the battery by vertical separators D, consisting of plates of hard rubber or other suitable insulating non-corrodible material, which are provided with slots, through which the ends of the plates are passed. The compound plates are thus supported at the proper distance from the bottom of the cell, and the entire structure of oxygen-electrode and separators is readily introduced into and removed from the cell by the yoke C, connecting the plates B.

The vertical support for the deposit forming the active hydrogen-electrode consists in the preferred form shown of thin sheets of copper E, which are shown as bent to U shape, so as to form double plates on either side of each of the compound plates B, the doubled copper plates being riveted together with one or more washers 6 between the plates, so as to provide space between them for a thin sheet of amalgamated zinc G, by which a supply of zinc is provided for starting the battery, as above described, the sheet of zinc G being slipped down between the doubled copper plates and supported above the bottom of the cell by a central rivet in the copper plates, as shown in Fig. 4. It will be understood, however, that any other suitable construction of the copper plates and means for supporting the zinc plate G may be employed.

As above stated, the copper plates E, forming the supports, are preferably perforated with a series of quite large holes, these holes being preferably of one-fourth to one-half an inch in diameter. By the use of these large holes I find that the deposit forms through the thin copper plates, so as to grip upon the inner edges thereof, thus affording a strong hold for the amalgam. These holes also provide free access of the battery fluid to the amalgamated-zinc sheets G between the copper supports. The copper supports are connected together by the riveting of the adjacent plates, so as to form, with the deposit, the hydrogen-electrode, and the terminals 8 are connected to the end plates in the usual manner. It is apparent that all the parts of the cell may readily be introduced into and removed from the liquid together, the copper supports E carrying with them on removal the oxygen-electrodes B and separators D, the latter resting upon the horizontal plates of the copper supports at the base of the cell.

As above stated, the mercury-supply may be in any part of the cell in surface contact with some part of the copper support, but is preferably formed by pouring a little mercury into the cell, and any suitable electrolyte may be used. It will be understood that a cell may be formed having only one support and one oxygen-plate, and that in batteries employing a number of cells the electrodes are arranged in pairs and the lugs or terminals of the same poles connected.

With the construction described any suitable means may be used for connecting the terminals 5 8 from the oxygen and hydrogen electrodes. As above stated, however, I have devised an improved connector, which is preferably used and which forms in itself a part of the present invention. This connector consists of a collar 9, provided with an opening of suitable form to receive the terminals 5 8, this opening being preferably concave at the ends when used with round conductors, so as to afford large contact-surfaces therewith, and a wedge 10, which is also formed, preferably, so as to engage the terminal with which it is in contact and the inner wall of the collar by large surfaces. It will be seen by an inspection of Figs. 5 and 6 that the terminals 5 8 may be firmly secured in the collar 9 by forcing in the wedge 10, and with the wedge extended through the collar 9, as shown, it may readily be removed by pressing up upon the smaller end, as by means of a pair of pinchers engaging the collar and this end of the wedge.

While in Figs. 5 and 6 I have shown my connector applied to join two round terminals, it will be understood that my connector is applicable, also, to terminals of other form, and the collar 9 may form itself one of the terminals and the wedge be used for joining any round or flat terminal thereto, the form of the collar and wedge being varied accordingly. Thus in Fig. 7 I have shown my connector used for uniting two flat terminals 11 12, the form of the collar 13 and wedge 14 being varied as required. The terminals 5 8, as above stated, may be of any suitable construction, but consist, preferably, of a copper core and lead covering.

It will be understood that I have shown but one of many constructions in which my invention may be embodied, and that the form and arrangement of the electrodes and other parts may be varied widely without departing from my invention, and that the improvements forming the broad invention may be applied in batteries employing different materials and of different action from that described and shown.

What I claim is—

1. A secondary-battery cell having a hydrogen-electrode consisting of a vertical conductive support inactive in the liquid, having an affinity for but not penetrated by mercury, and a coating of zinc and mercury on the surface of the support, forming the active material, substantially as described.

2. A secondary-battery cell having a hydrogen-electrode consisting of a vertical conductive support inactive in the liquid, having an affinity for but not penetrated by mercury and covered with a deposit of zinc, the cell containing a supply of mercury, substantially as described.

3. A secondary-battery cell having a hydrogen-electrode consisting of a vertical conductive support inactive in the liquid, having an affinity for but not penetrated by mercury and covered with a deposit of zinc, and a supply of mercury in the bottom of the cell in contact with the support, substantially as described.

4. A secondary-battery cell having a hydrogen-electrode consisting of a series of vertical conductive supports inactive in the liquid, having an affinity for but not penetrated by mercury and covered with a deposit of zinc, the cell containing a supply of mercury, substantially as described.

5. A secondary-battery cell having a hydrogen-electrode consisting of a series of vertical conductive supports inactive in the liquid, having an affinity for but not penetrated by mercury and covered with a deposit of zinc, the cell containing a supply of mercury, and an oxygen-electrode consisting of a series of vertical plates, substantially as described.

6. A secondary-battery cell having a hydrogen-electrode consisting of a vertical conductive support inactive in the liquid and having an affinity for but not penetrated by mercury, and a supply of zinc and mercury, whereby a deposit of zinc is formed on the support and the deposit amalgamated by capillary action, substantially as described.

7. A secondary-battery cell having a hydrogen-electrode consisting of a vertical conductive support inactive in the liquid and having an affinity for but not penetrated by mercury, an oxygen-electrode of lead, and a supply of zinc and mercury, substantially as described.

8. A secondary-battery cell having a hydrogen-electrode consisting of a vertical conductive support inactive in the liquid and having an affinity for but not penetrated by mercury, a supply of mercury, and one or more sheets of amalgamated zinc, forming a zinc-supply, substantially as described.

9. A secondary-battery cell having a hydrogen-electrode consisting of a vertical perforated conductive support inactive in the liquid and having an affinity for but not penetrated by mercury, and a supply of zinc and mercury, substantially as described.

10. A secondary-battery cell having a hydrogen-electrode consisting of a series of vertical perforated conductive supports arranged in pairs, said supports being inactive in the liquid and having an affinity for but not penetrated by mercury, a supply of mercury, and sheets of amalgamated zinc between the pairs of supports, forming a zinc-supply, substantially as described.

11. A secondary-battery cell having a hydrogen-electrode consisting of a vertical copper support and a coating of zinc and mercury on the surface of the support, forming the active material, substantially as described.

12. A secondary-battery cell having a hydrogen-electrode consisting of a vertical copper support covered with a deposit of zinc, the cell containing a supply of mercury, substantially as described.

13. A secondary-battery cell having a hydrogen-electrode consisting of a series of vertical copper supports covered with a deposit of zinc, the cell containing a supply of mercury, substantially as described.

14. A secondary-battery cell having a hydrogen-electrode consisting of a series of vertical perforated copper supports covered with a deposit of zinc, the cell containing a supply of mercury, substantially as described.

15. A secondary-battery cell having a hydrogen-electrode consisting of a series of vertical copper supports covered with a deposit of zinc, the cell containing a supply of mercury, and an oxygen-electrode consisting of a series of vertical plates, substantially as described.

16. A secondary-battery cell having a hydrogen-electrode consisting of a vertical copper support, an oxygen-electrode of lead, and a supply of zinc and mercury, substantially as described.

17. A secondary-battery cell having a hydrogen-electrode consisting of a vertical copper support, a supply of mercury, and one or more sheets of amalgamated zinc forming a zinc-supply, substantially as described.

18. A secondary-battery cell having a hydrogen-electrode consisting of a series of vertical perforated copper supports arranged in pairs, a supply of mercury, and a sheet of amalgamated zinc between each pair of supports, substantially as described.

19. A secondary-battery cell having a hydrogen-electrode consisting of a vertical perforated conductive support inactive in the liquid and an electro-deposit of zinc thereon, substantially as described.

20. A secondary-battery cell having an element consisting of a vertical copper plate supporting electro-deposited zinc, substantially as described.

21. A secondary-battery cell having an electrode consisting of a series of connected vertical copper plates supporting electro-deposited zinc, substantially as described.

22. A secondary-battery cell having a hydrogen-electrode consisting of a conductive support inactive in the liquid and not penetrated by mercury, zinc amalgam forming an active deposit thereon, and a supply of zinc consisting of one or more sheets of amalgamated zinc, substantially as described.

23. A secondary-battery cell having a hydrogen-electrode consisting of a series of conductive supports inactive in the liquid and arranged in pairs, zinc amalgam forming an active deposit thereon, and sheets of amalgamated zinc between said pairs of supports, forming the zinc-supply, substantially as described.

24. A battery-plate consisting of a series of laminæ of such material as to be increased in thickness in the action of the battery and having soluble material between the laminæ, whereby space is provided for the increase in thickness of the laminæ, substantially as described.

25. An oxygen battery-plate consisting of a series of laminæ with soluble material between the same, whereby space is provided for increase in thickness of the laminæ by oxidation, substantially as described.

26. An oxygen battery-plate consisting of a series of laminæ with soluble material and conducting material between the laminæ, whereby space is provided for increase of thickness of the laminæ by oxidation and the conductivity of the laminæ increased, substantially as described.

27. An oxygen battery-plate consisting of a series of laminæ with soluble material containing zinc between the same, substantially as described.

28. An oxygen battery-plate consisting of a series of laminæ with soluble material and graphite between the laminæ, substantially as described.

29. An oxygen battery-plate consisting of a series of laminæ with oxide of zinc and graphite between the laminæ, substantially as described.

30. The combination, with a battery terminal or terminals consisting of a core of high conductivity and a covering of conducting material non-corrodible by the battery acids, of a connector consisting of a collar of conducting material non-corrodible by the battery acids and constructed to receive the terminal or terminals and a wedge of similar material for securing the terminal or terminals in the collar, said collar and wedge being constructed to engage the terminal or terminals by surfaces conforming in shape thereto, whereby larger surfaces of contact are provided and a high conductivity secured with material of low specific conductivity, substantially as described.

31. An electric-battery connector consisting of a collar of conducting material non-corrodible by the battery acids and constructed to receive the conductor or conductors and a wedge of similar material for securing a conductor or conductors in the collar, said collar and wedge being constructed to engage the conductor or conductors by surfaces conforming in shape thereto, whereby large surfaces of contact are provided and a high conductivity secured with material of low specific conductivity, substantially as described.

32. The method of making a battery-plate, which consists in superposing a series of laminæ with soluble material between them and dissolving out the soluble material, substantially as described.

33. The method of making a battery-plate, which consists in superposing a series of laminæ with soluble material and conductive material between them and dissolving out the soluble material, substantially as described.

34. The method of making a battery-plate, which consists in superposing a series of laminæ with soluble material required in the battery between them and dissolving out the soluble material in the battery liquid, substantially as described.

In testimony whereof I have hereunto set my hand in the presence of two subscribing witnesses.

WILLIAM MAIN.

Witnesses:
T. F. KEHOE,
C. J. SAWYER.